Nov. 10, 1953     R. G. HALL     2,658,466
APPARATUS FOR REMOVING EXCESS SOLDER
FROM SOLDERED ARTICLES

Filed May 5, 1948     4 Sheets-Sheet 1

INVENTOR.
ROLLAND G. HALL

BY Edwin Leusoh

ATTORNEY.

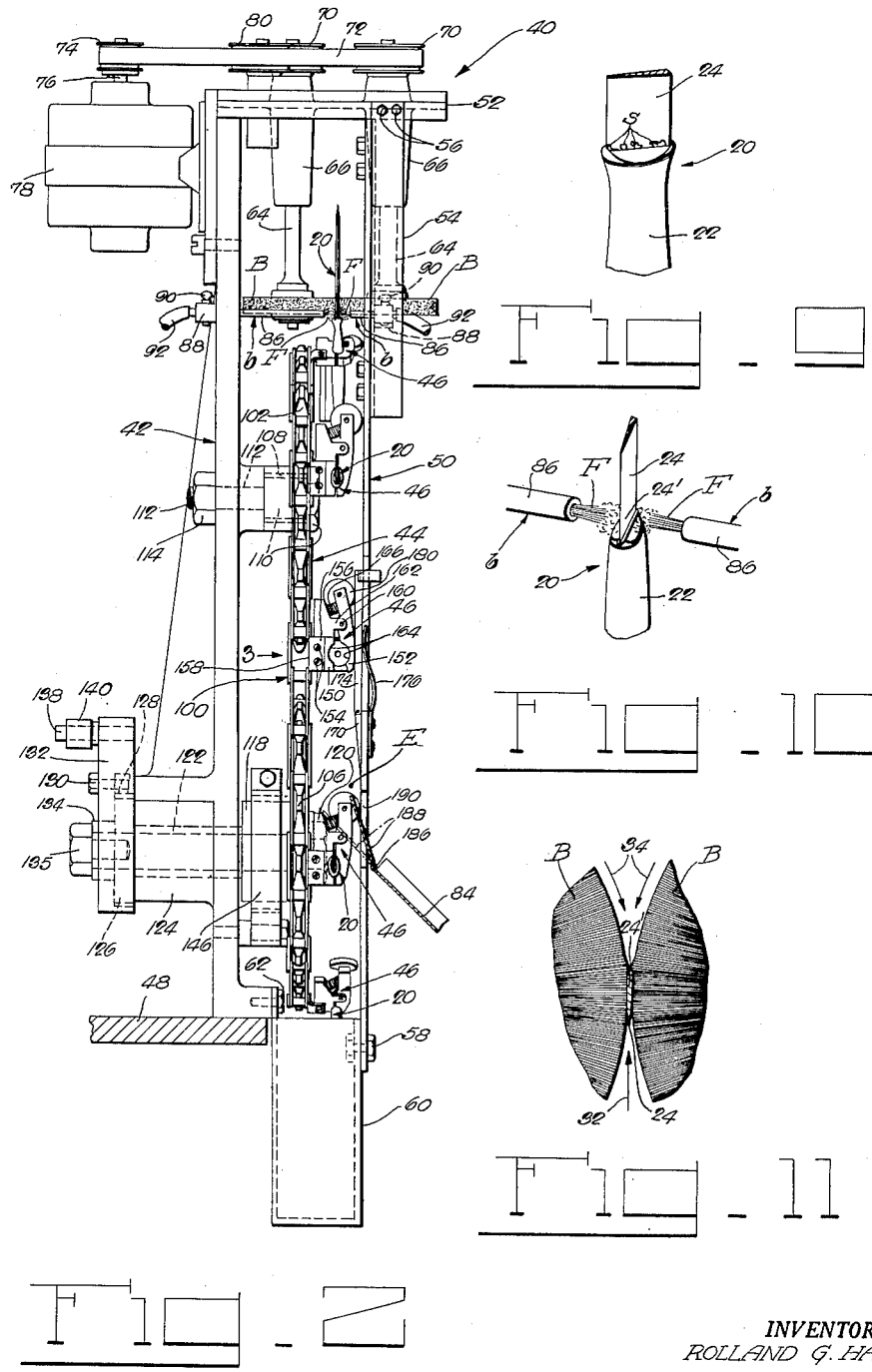

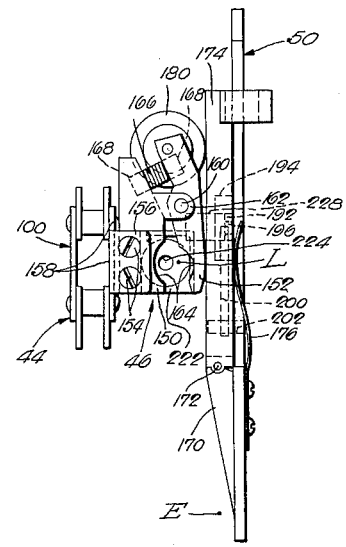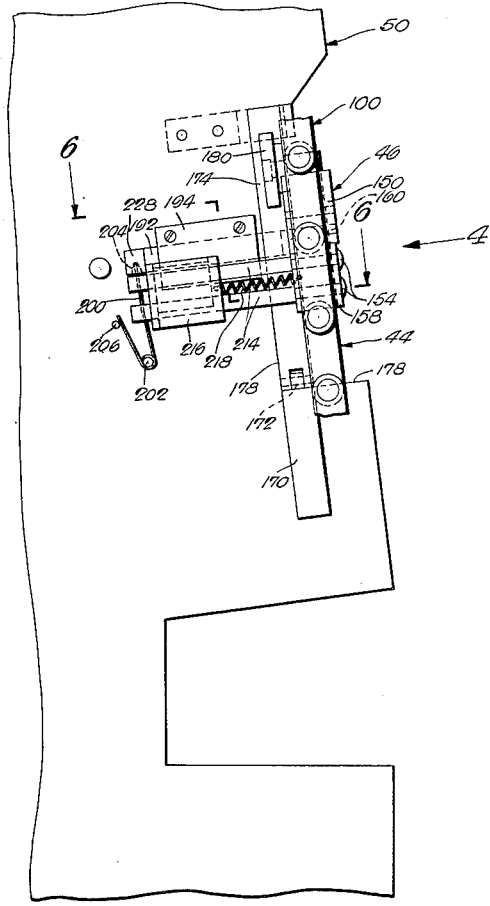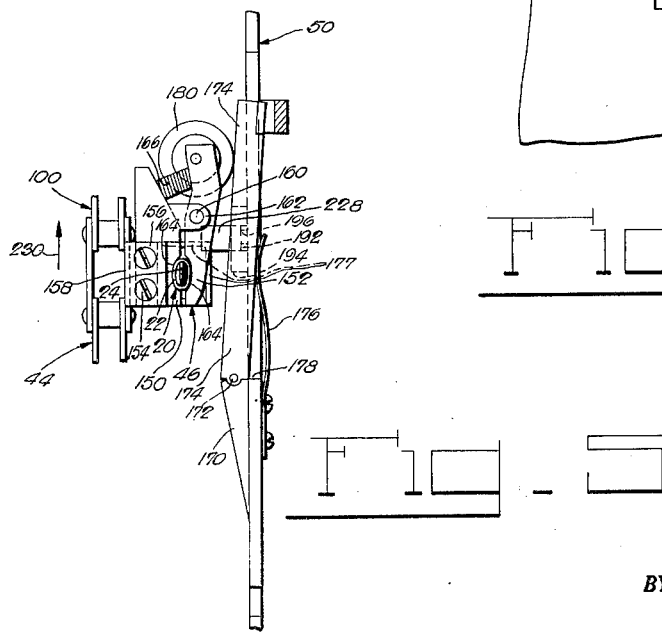

INVENTOR.
ROLLAND G. HALL
BY Edwin Leinohr
ATTORNEY.

Patented Nov. 10, 1953

2,658,466

UNITED STATES PATENT OFFICE 2,658,466

APPARATUS FOR REMOVING EXCESS SOLDER FROM SOLDERED ARTICLES

Rolland G. Hall, Yalesville, Conn., assignor to R. Wallace & Sons Manufacturing Company, Wallingford, Conn., a corporation Application May 5, 1948, Serial No. 25,138

12 Claims. (Cl. 113—97)

This invention relates to apparatus for removing excess solder from soldered articles, and especially from knives of which the blades are soldered in the handles.

The type of knife with which the present invention is especially concerned has a conventional hollow handle, and a knife blade which is provided with a shank that is inserted into the open end of the handle and soldered therein. A convenient and efficient way to solder the shank of a blade in a knife handle is to insert in the latter a strip of solder, then extend the shank of the blade into the handle and heat the latter from the outside while the knife is being held with the blade down, so that the molten solder will fill out the space between the inserted blade shank and surrounding portion of the handle. In doing so a small amount of solder usually escapes from the handle past the inserted blade shank and deposits on the blade proper.

It is the primary object of the present invention to provide apparatus in which the blades of soldered knives are subjected to a flame or flames for such a short period of time that only the solder on the knife blades will melt, whereupon the melted solder is immediately wiped off the blades.

It is another important object of the present invention to render the apparatus fully automatic and continuous in operation, to the extent that an operator need merely place knife after knife in the apparatus and pay no further attention thereto.

It is another important object of the present invention to provide the apparatus with an intermittently indexed chain conveyor which carries knife holders that are successively advanced progressively from a loading station to a heating station, thence past a wipe-off station, and finally over an automatic ejecting station back to the loading station.

It is another important object of the present invention to make the knife holders in the form of clamps which are normally yieldingly closed on knives placed therein, and which are automatically opened at the ejecting station and released for closing by knives inserted therein at the loading station.

The above and other objects, features and advantages of the present invention will be more fully understood from the following description considered in connection with the accompanying illustrative drawings.

In the drawings:

Fig. 2 is a front elevation of the apparatus as viewed in the direction of the arrow 2 in Fig. 1;

Fig. 3 is a side elevation of a part of the apparatus as viewed in the direction of the arrow 3 in Fig. 2;

Fig. 4 shows the same part of the apparatus as viewed in the direction of the arrow 4 in Fig. 3;

Fig. 5 is a view similar to Fig. 4, showing certain parts in different operating positions, however;

Fig. 6 is an enlarged section taken on the line 6—6 of Fig. 3;

Fig. 9 is a perspective view of that part of a knife on which the present apparatus is to perform; and Figs. 10 and 11 are views illustrating the different operations, respectively, which are performed by the present apparatus.

Figure 8:
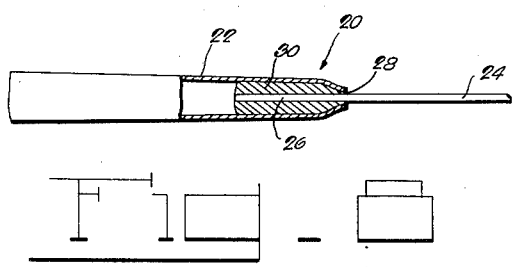
Fig. 8 is a fragmentary back view, partly in section, of a knife adapted to be operated on in the present apparatus.

Referring to the drawings, and more particularly to Fig. 8 thereof, the reference numeral 20 designates a conventional type of table knife, for instance, which comprises the usual hollow handle 22 and a blade 24, having the customary shank 26 which is inserted into the open end 28 of the handle 22. In accordance with the usual practice, the inserted shank 26 of the blade 24 is soldered in the handle 22 as at 30. As previously mentioned, the blade 24 is conveniently and efficiently soldered to the knife handle 22 by inserting into the latter first a solid strip of solder and then the shank 26 of the blade 24, whereupon the handle 22 is subjected to a flame or flames. While thus heating the knife handle 22, the knife is preferably held with its blade down so that the melting solder will flow to and fill the space between the inserted blade shank 26 and surrounding portion of the hollow handle 22 to an extent like, or similar to, that shown in Fig. 8. While the open end of the knife handle is, just prior to the heating of the latter, customarily stemmed against the inserted blade shank 26 in order there to close the knife handle rather tightly on the blade shank 26, nevertheless a small amount of the melted solder will usually find its way from the interior of the handle 22 past the shank 26 of the blade 24 and deposit on the latter in a manner like, or similar to, that shown at s in Fig. 9.

The present apparatus is designed to remove this excess solder s from the knife blades. Briefly, the present apparatus performs on a knife blade in the different ways shown in Figs. 10 and 11. Thus, the blade 24 of a knife is, at the heating station of the apparatus, subjected to opposite flames F in the vicinity of the adjacent end of the knife handle 22 (Fig. 10). The flames F will melt any excess solder s on the blade 24, whereupon the knife is quickly advanced so that the heated base portion 24' of the blade 24 passes edgewise between opposite rotary brushes B (Fig. 11) that wipe off any melted solder on the blade 24. In heating the knife blade 24 between the flames F, as explained, the knife is preferably held with its handle down, so as to prevent any solder that may possibly melt in the handle 22 from running out of the latter. The brushes B, which may be of a fine wire type, are preferably turned in such opposite directions that the adjacent portions of their peripheries move counter to the knife blade 24 on its passage therebetween. Thus, the knife may pass between the brushes B in the direction of the arrow 32 (Fig. 11), in which case the brushes B would turn in the direction of the arrows 34. In thus turning the brushes B, the same will wipe a passing knife blade 24 clean of any melted solder thereon, even if the knife blade passes at a fairly high rate of speed.

Figure 1:
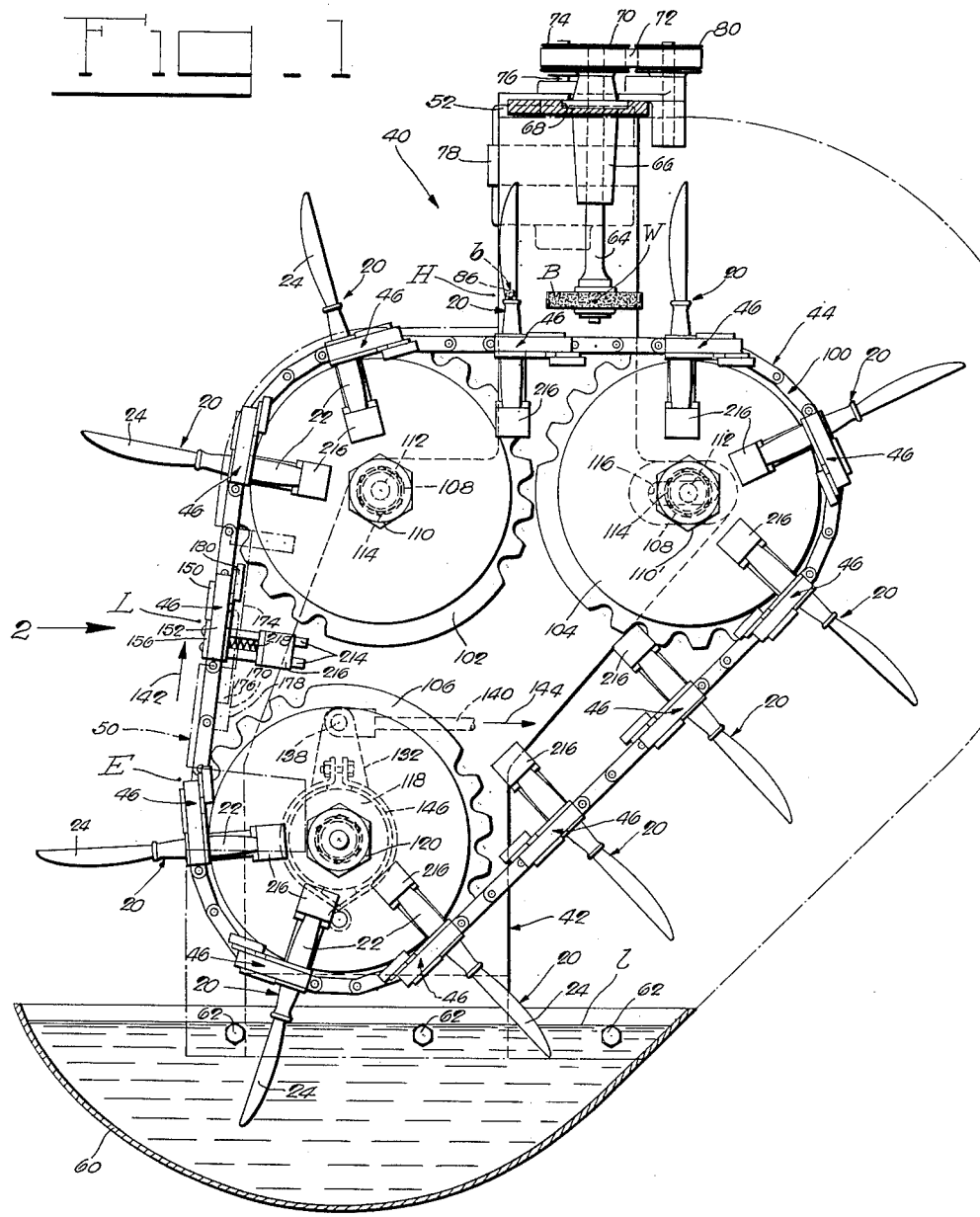
Fig. 1 is a side-elevational view, partly in section, of apparatus embodying the present invention.

Referring now to Figs. 1 and 2, the present apparatus 40 comprises an upright frame or bracket 42 on which are mounted the brushes B and flame-producing burners b, as well as an endless chain conveyor 44 which carries a plurality of holders 46 for the knives 20. The frame 42 itself may suitably be mounted on any convenient support 48 (Fig. 2). For additional mounting and other purposes, the apparatus further comprises an upright side panel 50 which may be mounted on an overhead extension 52 of the frame 42, through intermediation of spaced angles 54 that extend to the opposite sides of the frame extension 52 and are secured thereto as by bolts 56, for instance (Fig. 2). Side panel 50 is shown in dot-and-dash outline in Fig. 1 for clearer illustration of the parts normally hidden therebehind. Secured at 58 to the lower end of the side panel 50 is a tank 60 which is also secured at 62 to the frame 42. Thus, the side panel 50 not only participates in the support of the tank 60, but is itself held rigid at its lower end through the interposition between it and the frame 42 of the tank 60.

The brushes B are carried by the lower ends of spindles 64 which, in the present instance, extend vertically upwardly and are journaled in bearing brackets 66 that are preferably slidable to and from each other in a guideway 68 provided in the frame extension 52 (Fig. 1). The bearing brackets 66 may be clamped in any adjusted position in the guideway 68 by any suitable means (not shown). The upper ends of the brush-carrying spindles 64 carry pulleys 70, respectively, over which pass a belt 72 that is driven from a pulley 74 on the shaft 76 of a prime mover, such as an electric motor 78 which is suitably mounted on the frame 42. The belt 72 passes also over a guide pulley 80 which is suitably journaled in the frame extension 52, and so located that the single belt 72 may drive the brushes B in the previously described opposite directions.

Each of the burners b comprises a burner tube 86, and a mixing valve 88 of any conventional type, in which a heating gas and air may be mixed in variable proportions, and which may be shut off by a cock 90. Heating gas is conducted from a supply source to each mixing valve 88 through a suitable hose connection 92. The valves 88 may suitably be mounted on the frame 42 and side panel 50, respectively, and their respective burner tubes 86 extend into fairly close proximity to each other, as shown in Fig. 2.

The chain conveyor 44 comprises an endless chain 100 which passes over sprocket wheels 102, 104 and 106 that may be of identical size. The sprocket wheels 102 and 104 may be journaled on bushings 108 (Fig. 2) which surround headed studs 110, having threaded shanks 112 that extend through the frame 42 and receive nuts 114 for the secure mounting of the studs 110 on the frame 42. Preferably, the mounting stud 110' for the sprocket wheel 104, is as indicated in Fig. 1, adjustable in an elongated slot 116 for the purpose of taking up slack in the chain 100. The sprocket wheel 106 is mounted with its hub 118 on a headed stud 120, which is journaled in a bushing 122 in a boss 124 of the frame 42 and carries at its outer end a ratchet disc 126 with which cooperates a pawl 128, pivotally carried at 130 on a pawl carrier 132 that may suitably be journaled on the boss 134 of the ratchet disc 126. A bolt 135 may threadedly be received in the outer end of the stud 120 for the secure mounting of the latter in the frame 42 and the retention on the stud 120 of the parts 106, 126 and 132. Pivotally connected at 138 with the pawl carrier 132 is one end of a link 140 which may be connected at its other end with any suitable, periodically power-driven means such as a crank (not shown), that imparts reciprocatory motion to the link 140. The pawl 128 is arranged to index the sprocket wheel 106 so that the conveyor chain 100 is advanced in the direction of the arrow 142 in Fig. 1 during each return stroke of the link 140 in the direction of the arrow 144. In order to prevent overrunning of the conveyor chain 100, there is preferably provided a permanently acting band-type brake 146 which embraces the hub 118 of the sprocket wheel 106.

The knife holders 46, which are identical in construction and carried by the conveyor chain 100 at equally spaced intervals, are made in the form of clamps shown best in Figs. 3 to 7, inclusive. Thus, each knife holder 46 comprises two clamp sections 150 and 152 of which the former is suitably secured, as by screws 154, to a lateral flange 156 of a special link 158 of the conveyor chain 100. The clamp section 152 is pivoted at 160 to spaced ears 162 of the companion section 150, and both sections 150 and 152 are provided with oppositely curved clamping surfaces 164 with which to clamp the handle 22 of a knife 20 in the fashion best shown in Figs. 5 and 7. The sections 150 and 152 of each holder 46 are normally urged into clamping engagement with an interposed knife handle 22 by means of a compression spring 166 which is seated in opposite recesses 168 in the clamp sections, respectively. The clamping surfaces 164 of the sections 150 and 152 of each holder 46 are made such that a knife 20 clamped therebetween extends with its blade 24 edgewise in the direction of movement of the conveyor chain (Figs. 1 and 5).

Provisions are also made automatically to open the clamp sections of each knife holder 46 to permit the gravity discharge of a knife therefrom at an ejecting station E (Fig. 2), after the holder has, on each cycle of movement in the apparatus, passed through the heating and wipe-off stations H and W, respectively, and before the same reaches the loading station L of the apparatus, and to hold the clamp sections open during the holder's passage from the ejecting station E to the loading station L. Further provisions are also made to permit the clamp sections of each holder 46 to close at the loading station L on the placement therein of the handle 22 of a knife 20. Thus, there is suitably mounted on the inner side of the side panel 50 a wedge-shaped cam 170 (Figs. 3 and 4) to which is pivoted at 172 a cam extension 174, normally urged by a spring 176 into the projected position shown in Fig. 4, and depressible against the spring 176 in the fashion shown in Fig. 5. The side panel 50 is recessed at 178 (Figs. 1, 3 and 5) in order to permit the described depression of the cam extension 174 into the position shown in Fig. 5. The clamp section 152 of each knife holder 46 carries a follower 180 in the form of a roller which, on movement of the holder past the cam 170, ascends on the latter and thereby opens the clamp sections 150 and 152 at the ejecting station E of the apparatus, permitting the knife in the holder to drop therefrom. The cam extension 174 is normally locked in the projected position, shown in Fig. 4, by latching means hereinafter described, so that the clamp sections 150 and 152 of each holder 46 will remain open during movement of the latter from the ejecting station E to the loading station L (Fig. 4).

Recourse may be had to any expediency to prevent the ejected knives from dropping into the tank 60. Thus, there may suitably be mounted on the side panel 50 a chute 84 (Fig. 2) to which may be pivoted at 186 a chute extension 188 that normally extends through a recess 190 in the side panel 50 into the dot-and-dash line position shown in Fig. 2 in which to guide any knife dropping from a holder 46 at the ejecting station E into the chute 184. The chute extension 188 is preferably spring-urged into the normal dot-and-dash line position shown in Fig. 2, in order to be depressible by a passing holder 46 into the full-line position shown in the same figure.

The latch means previously referred to comprises a latch 192 which is slidable on the side panel 50 transversely of the cam extension 174. Latch 192 is guided for sliding movement in a guide member 194 which may suitably be secured to the side panel 50. The lock end 196 of the latch 192 is undercut at opposite sides so as to be reduced widthwise and provide the latch with stop shoulders 198. The latch 192 is normally urged into the locking position shown in Fig. 6 by a spring 200 which, as best shown in Fig. 3, is anchored at 202 on the side panel 50 and has one end projecting into a recess 204 in the latch 192, while the other end of the spring bears against a pin 206 on the side panel 50. The cam extension 174 is provided in its outer face with a groove 210 which is of the same width as the latch end 196, and is in alignment with the latter when the cam extension 174 is in the projected position shown in Figs. 4 and 6. Thus, it is only the lock end 196 of the latch 192 that may enter the groove 210 in the cam extension 174, the opposite shoulders 198 on the latch preventing movement of the latter into the groove 210 of the cam extension beyond the position shown in Fig. 6.

Figure 7:
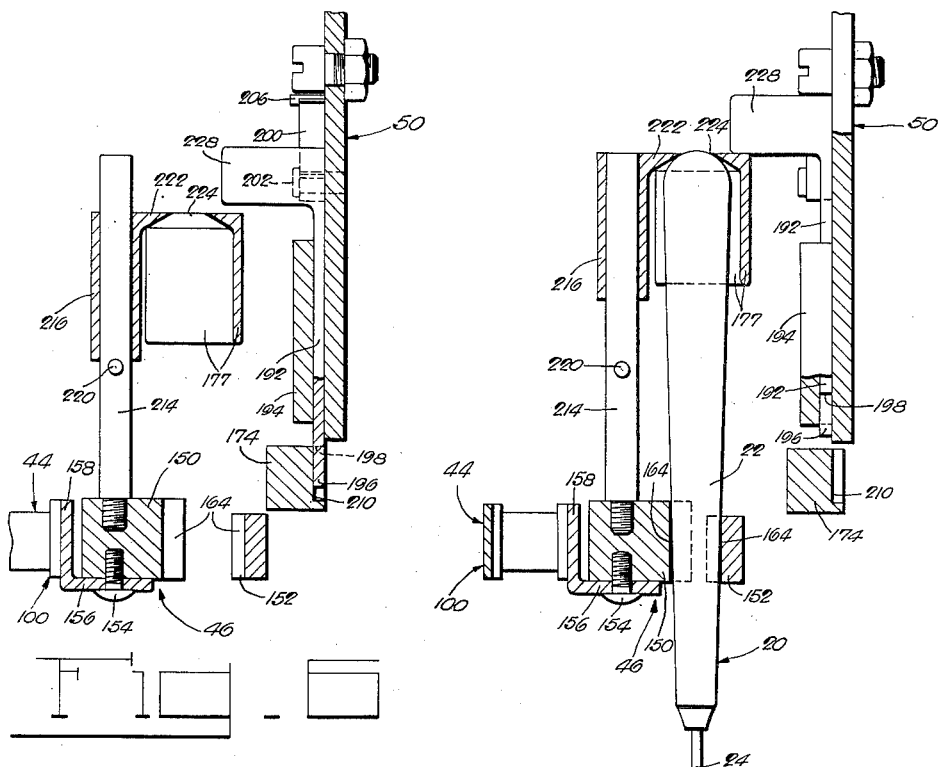
Fig. 7 is a section similar to Fig. 6, showing certain parts in different operating positions, however.

The clamp section 150 of each knife holder 46 carries two spaced, rearwardly extending rods 214 on which a yielding stop member 216 is slidable. The stop member 216 is normally urged by a spring 218 into the advanced position shown in Fig. 6, in which it bears against a cross pin 220 in one of the rods 214. The spring 218 is suitably anchored with its ends to the clamp section 150 and stop member 216 respectively. The stop member 216 is provided with a laterally extending lug 222 which is preferably apertured at 224, and adapted to be engaged by the end of a knife handle being inserted lengthwise between the open clamp sections 150 and 152 of the holder at the loading station L, whereby the stop member 216 is disposed from its advanced position into the position shown in Fig. 7. While the stop member 216 of the holder 46 at the loading station L is thus depressed by an inserted knife handle 22, the lug 222 of the stop member engages a lateral extension 228 of the latch 192 and retracts the latter from locking relation with the cam extension 174 (Figs. 5 and 7). Retraction of the latch 192 from locking relation with the cam extension 174 will result in immediate closure of the adjacent holder 46 and depression of the cam extension 174 into the position, shown in Fig. 5, because the closing force of the spring 166 of each holder is greater than the force of the spring 176 that urges the cam extension 174 into the projected position shown in Fig. 4. The lug 222 of the stop member 216 of each holder 46 is preferably provided with deflectors 177 that guide a knife blade being inserted against the lug 222, and prevent its crooked insertion to the extent where it would directly engage and depress the latch 192. The lug 222 and roller 180 of any holder at the loading station L are preferably so coordinated with the latch extension 228 and cam extension 174, respectively, that on the next indexing step of the holder from the loading station in the direction of the arrow 230 in Fig. 5, the lug 222 will keep the latch 192 depressed until after the roller 180 on the holder has advanced beyond the cam extension 174 and the latter has spring-returned into the projected position. In this wise, the return of the cam extension into projected position is not obstructed by any contact with the spring-urged latch 192, as will be readily understood. The stop member 216 of each holder 46 will remain in the depressed position shown in Fig. 7, after the holder is spring-closed on an inserted knife handle on unlatching the cam extension 174 as described, because the spring force with which the stop member 216 is urged into its advanced position is weaker than the force with which the inserted knife handle is clamped in the holder by the spring 166 thereof. Thus, each holder 46 is, on being indexed into the loading position L, automatically opened at the ejecting station E, and remains open for the remainder of the indexing step, the cam extension 174 being at that time locked in its projected position by the latch 192. However, on insertion of a knife handle 22 into an open holder 46 at the loading station L, the cam extension 174 is unlatched and the holder is permitted to spring-close on the inserted knife handle. Finally, the cam extension 174 is returned to its projected position and locked by the latch 192 before the next holder 46 will move into cooperative relation therewith.

*Mode of operation of the apparatus*

Assuming that the burners b are lighted, the brushes B are driven by the motor 78, and the chain conveyor 44 is periodically indexed through steps which are equal in length to the distance between consecutive holders 46, an operator will insert in the previously explained manner the handle 22 of a knife 20 into each holder 46 when the same stops intermittently at the loading station L. This is the only task required of the operator. Each holder 46 comes to an intermittent stop at the heating station H at which the flames F from the burners *b*, during a flash heating operation, sweep the blade of the inserted knife and melt any excess solder *s* that may be deposited on the blade. On the next indexing step of the chain conveyor 44, the knife presently at the heating station H is advanced so that its blade passes edgewise between the rotary brushes B which wipe off the molten solder on the blade. The blades 24 of the knives on the chain conveyor 44 pass through any suitable cooling liquid *l* in the tank 60 before they reach the ejecting station E where they are released from their respective holders and gravitate from the apparatus through the chute 84 as described.

While I have shown and described the preferred embodiment of my invention, it will be understood that various changes may be made in the present invention without departing from the underlying idea or principles of the invention within the scope of the appended claims.

Having thus described my invention, what I claim and desire to secure by Letters Patent is:

1. In apparatus of the character described, the combination of an endless conveyor, equally spaced clamps carried by said conveyor, mechanism for intermittently indexing said conveyor to bring successive clamps from an ejecting station to a loading station on successive indexing steps, respectively, of said conveyor, each clamp comprising complementary sections, one of said sections being mounted on the conveyor and the other section being pivotally mounted on said first mentioned section, spring means interengaging said sections and biasing said other section into closing relation with said first mentioned section, a follower on said other section, a fixed cam at said ejecting station cooperating with the follower of a passing clamp moving toward said loading station to open said clamp, a cam extension provided on said fixed cam at said loading station, spring means normally biasing said cam extension into a projected position in which to cooperate with the follower of a passing clamp to hold the latter open on its movement into said loading station, a latch provided with spring means to normally bias said latch into positions to lock said cam extension against being depressed from its projected position by the closing bias of a passing open clamp, said closing bias being greater than said cam bias, and means provided on each clamp for operation by an article placed in an open clamp at said loading station, said article-operated means being operable upon said latch means for retracting said latch from locking relation with said cam extension.

2. The combination, as set forth in claim 1, in which said article-operated means comprises a member movably carried by said one section of each clamp.

3. The combination, as set forth in claim 1, in which said conveyor comprises sprockets and a chain passing over said sprockets and said one section of each clamp having a portion forming a regular link of said chain.

4. In apparatus for removing excess solder from the blades of knives having handles, said apparatus having a flame-producing burner at a first station and a pair of rotating brushes at a second station, the combination of an endless conveyor, equally spaced holders provided on said conveyor for releasably retaining the handles of said knives, mechanism for intermittently indexing said conveyor through step-wise movements equal to the distance between consecutive holders whereby a holder is always in position at said first station to subject its knife blade to the flames of said burner for a flash-heating operation during each intermittent rest period of said conveyor, said mechanism including means to index the conveyor with rest periods such that only the excess solder is melted by said burner, and each of said step-wise movements of said conveyor being of a greater length than the distance between said stations longitudinally of said conveyor so that a knife clamped in a holder positioned at said first station passes between the brushes and beyond said second station during the next step-wise movement of said conveyor.

5. Apparatus as set forth in claim 4, in which said holders have means to carry the knives by their handles, said conveyor and holders being so arranged that the blades of the knives extend substantially vertically upwardly from their handles in the holders when the latter pass through said stations, and said brushes turn about substantially vertical axes in such opposite directions that the adjacent portions of their peripheries move counter to a passing knife blade.

6. In apparatus for removing excess solder from the blades of knives having handles, said apparatus having a flame-producing burner at a first station and a pair of rotating brushes at a second station, the combination of an endless conveyor, equally spaced holders provided on said conveyor for releasably retaining the handles of said knives, mechanism for intermittently indexing said conveyor through step-wise movements equal to the distance between consecutive holders whereby a holder is always in position at said first station to subject its knife blade to the flames of said burner for a flash-heating operation during each intermittent rest period of said conveyor, said mechanism including means to index the conveyor with rest periods such that only the excess solder is melted by said burner, and each of said step-wise movements of said conveyor being of a greater length than the distance between said stations longitudinally of said conveyor so that a knife clamped in a holder positioned at said first station passes between the brushes and beyond said second station during the next step-wise movement of said conveyor, said indexing means including a member mounted for reciprocation, said mechanism operating through an indexing step thereof in response to the movement of said member in a first direction and said rest periods being determined by the movement of said member in an opposite direction.

7. In apparatus for removing excess solder from the blades of knives having handles, said apparatus having a loading station, a flame-producing burner at a second station and a pair of rotating brushes at a third station, the combination of an endless conveyor, equally spaced holders provided on said conveyor for releasably retaining the handles of said knives, mechanism for intermittently indexing said conveyor through step wise movements equal to the distance between consecutive holders whereby holders are always in position at said loading station and said second station, respectively, for subjecting the knife blade in the holder at said second station to the flames of said burner for a flash-heating operation during each intermittent rest period of said conveyor, said mechanism including means to index the conveyor with rest periods such that only the excess solder is melted by said burner, and each of said step wise movements of said conveyor being of a greater length than the distance between said second and third stations longitudinally of said conveyor so that a knife clamped in a holder positioned at said second station passes between the brushes and beyond said third station during the next step wise movement of said conveyor.

8. In apparatus for removing excess solder from the blades of knives having handles, said apparatus having a loading station, a flame-producing burner at a second station and a pair of rotating brushes at a third station, the combination of an endless conveyor, equally spaced holders provided on said conveyor for releasably retaining the handles of said knives, mechanism for intermittently indexing said conveyor through step wise movements equal to the distance between consecutive holders whereby holders are always in position at said loading station and said second station, respectively, for subjecting the knife blade in the holder at said second station to the flames of said burner for a flash-heating operation during each intermittent rest period of said conveyor, said mechanism including means to index the conveyor with rest periods such that only the excess solder is melted by said burner, and each of said step wise movements of said conveyor being of a greater length than the distance between said second and third stations longitudinally of said conveyor so that a knife clamped in a holder positioned at said second station passes between the brushes and beyond said third station during the next step wise movement of said conveyor, said holders being clamps carried on said conveyor, means provided on said clamps to normally yieldingly close on a knife handle inserted therein at said loading station, an ejecting station provided on said apparatus prior to said loading station in the direction of movement of said conveyor, means normally opening each clamp on movement of the latter into said ejecting station, and means at said loading station to retain the clamps in open condition upon movement thereof from said ejecting station said latter means being operatively responsive to the insertion of a knife handle into an open clamp at said loading station to release the latter clamp for closure upon the knife handle.

9. Apparatus as set forth in claim 8 in which said latter means comprise a cam movable between operative and inoperative positions thereof and spring means to bias said cam into operative position thereof in which it is in the path of each clamp moving from said ejecting station into said loading station, latch means including spring means to bias said latch into position to lock said cam against movement from its operative position by the closing bias of an engaging open clamp, said closing bias being greater than said cam bias, and article-operated means mounted for movement by a knife handle being placed in an open clamp at said loading station for retracting said latch from locking relation with said cam.

10. Apparatus as set forth in claim 8 in which said latter means comprise a cam movable between operative and inoperative positions thereof and spring means to bias said cam into operative position thereof in which it is in the path of each clamp moving from said ejecting station into said loading station, latch means including spring means to bias said latch into position to lock said cam against movement from its operative position by the closing bias of an engaging open clamp, said closing bias being greater than said cam bias, and article-operated means mounted for movement by a knife handle being placed in an open clamp at said loading station for retracting said latch from locking relation with said cam, said latch having a part disposed for engagement by said article-operated means for retracting said latch from said locking relation with said cam.

11. In apparatus of the character described, the combination of an endless conveyor, equally spaced clamps carried by said conveyor, spring means provided on each clamp to normally resiliently bias the latter to close on an article placed therein, mechanism for intermittently indexing said conveyor to bring successive clamps from an ejecting station to a loading station on successive indexing steps, respectively, of said conveyor, clamp-opener means operable to open each clamp upon movement thereof into said ejecting station, clamp-engaging means at said loading station normally biased from a retracted position to a projected position into the path of movement of each clamp moving from said ejecting station to said loading station and disposed to engage each clamp as it moves from the ejecting station to retain the latter in the open condition thereof, latch means at said loading station normally biased into position to releasably lock said clamp-engaging means in said projected position thereof from movement of the latter to its retracted position by said closing bias of the clamp in position at said loading station, and means provided on each clamp for operation by an article placed in an open clamp at said loading station, said article-operated means being operable upon said latch means for retracting said latch means from locking relation with said clamp engaging means, whereby said spring means on each clamp is effective to close the clamp upon an article placed therein at said loading station.

12. In apparatus of the character described, the combination of an endless conveyor, equally spaced clamps carried by said conveyor, spring means provided on each clamp to normally resiliently bias the latter to close on an article placed therein, mechanism for intermittently indexing said conveyor to bring successive clamps from an ejecting station to a loading station on successive indexing steps, respectively, of said conveyor, clamp-opener means operable to open each clamp upon movement thereof into said ejecting station, clamp-engaging means at said loading station normally biased from a retracted position to a projected position into the path of movement of each clamp moving from said ejecting station to said loading station and disposed to engage each clamp as it moves from the ejecting station to retain the latter in the open condition thereof, latch means at said loading station normally biased into position to releasably lock said clamp-engaging means in said projected position thereof from movement of the latter to its retracted position by said closing bias of the clamp in position at said loading station, and means provided on each clamp for operation by an article placed in an open clamp at said loading station, said article-operated means being operable upon said latch means for retracting said latch means from locking relation with said clamp engaging means, whereby said spring means on each clamp is effective to close the clamp upon an article placed therein at said loading station, said latch having a part disposed for engagement by said article-operated means for retracting said latch from locking relation with said clamp-engaging means.

ROLLAND G. HALL.

References Cited in the file of this patent

UNITED STATES PATENTS

| Number | Name | Date |
|---|---|---|
| 305,154 | Curry | Sept. 16, 1884 |
| 543,401 | Petterson | July 23, 1895 |
| 652,581 | Ayers | June 26, 1900 |
| 702,168 | Williams | June 10, 1902 |
| 934,191 | Krummel | Sept. 14, 1909 |
| 1,136,110 | Eberhart | Apr. 20, 1915 |
| 1,290,888 | Bracy | Jan. 14, 1919 |
| 1,536,186 | Arnold | May 5, 1925 |
| 1,645,600 | Kohler | Oct. 18, 1927 |
| 1,650,436 | Ekvall | Nov. 22, 1927 |
| 1,687,201 | Hagen | Oct. 9, 1928 |
| 2,132,145 | Cameron | Oct. 4, 1938 |
| 2,251,517 | Goebel | Aug. 5, 1941 |
| 2,401,930 | Hansen | June 11, 1946 |
| 2,645,796 | Leece | July 21, 1953 |